US012570348B2

(12) United States Patent
Lancaster et al.

(10) Patent No.: US 12,570,348 B2
(45) Date of Patent: Mar. 10, 2026

(54) MOTORIZED WAGON AND OPERATION METHOD THEREOF

(71) Applicant: ELLAVATE WAGON, INC., Newport Beach, CA (US)

(72) Inventors: Megan Lancaster, Newport Beach, CA (US); Michael Bubolz, Milwaukee, WI (US)

(73) Assignee: ELLAVATE WAGON, INC., Newport Beach, CA (US)

( * ) Notice: Subject to any disclaimer, the term of this patent is extended or adjusted under 35 U.S.C. 154(b) by 128 days.

(21) Appl. No.: 18/222,871

(22) Filed: Jul. 17, 2023

(65) Prior Publication Data

US 2024/0017757 A1      Jan. 18, 2024

Related U.S. Application Data

(60) Provisional application No. 63/389,565, filed on Jul. 15, 2022.

(51) Int. Cl.
| | |
|---|---|
| *B62B 5/00* | (2006.01) |
| *B60L 58/12* | (2019.01) |
| *B62B 3/00* | (2006.01) |
| *B62B 5/04* | (2006.01) |

(52) U.S. Cl.
CPC ............ *B62B 5/0073* (2013.01); *B60L 58/12* (2019.02); *B62B 5/004* (2013.01); *B62B 5/0053* (2013.01); *B62B 5/04* (2013.01); *B60L 2200/30* (2013.01); *B60L 2240/545* (2013.01); *B62B 3/002* (2013.01)

(58) Field of Classification Search
CPC ..... B62B 5/0073; B62B 5/004; B62B 5/0053;

B62B 5/04; B62B 3/002; B62B 3/001; B62B 5/0069; B60L 58/12; B60L 2200/30; B60L 2240/545; B60L 2220/42; B60L 2220/44; B60L 15/2036; B60L 2240/461

See application file for complete search history.

(56) References Cited

U.S. PATENT DOCUMENTS

| | | | |
|---|---|---|---|
| 6,276,471 B1 * | 8/2001 | Kratzenberg | ......... B62B 5/0026 180/19.1 |
| 7,210,545 B1 | 5/2007 | Waid | |
| 7,658,247 B2 * | 2/2010 | Carter | .................... B60L 58/15 180/65.24 |
| 7,762,363 B1 | 7/2010 | Hirschfeld | |

(Continued)

FOREIGN PATENT DOCUMENTS

| | | | | | |
|---|---|---|---|---|---|
| CN | 108357525 A | * | 8/2018 | .......... | B62B 5/0069 |
| EP | 1298023 A1 | * | 4/2003 | .......... | B62B 5/0026 |
| WO | WO-2013166593 A1 | * | 11/2013 | ............. | B60B 33/00 |

*Primary Examiner* — James A Shriver, II
*Assistant Examiner* — Ian Bryce Shelton
(74) *Attorney, Agent, or Firm* — Innovent Law P.C.; Karima Gulick

(57) ABSTRACT

A motorized wagon system according to the present disclosure includes a frame, a base coupled to the frame, a first wheel set and a second wheel set connected to the base, a handle connected to the frame, and a control system. The control system includes a first sensor and a second sensor configured to measure two forces applied on different portions of the handle. The control system further includes a controller that controls the first wheel set based on measurements of the first sensor and the second wheel set based on measurements of the second sensor.

20 Claims, 16 Drawing Sheets

(56) References Cited

U.S. PATENT DOCUMENTS

| | | | | |
|---|---|---|---|---|
| 8,286,739 | B2 | 10/2012 | Oliphant | |
| 8,596,389 | B2 | 12/2013 | Anasiewicz | |
| 8,706,332 | B2* | 4/2014 | Kume | B62B 3/001 |
| | | | | 701/22 |
| 9,186,992 | B2* | 11/2015 | Katayama | B60K 28/16 |
| 9,227,647 | B2* | 1/2016 | Masaki | B62B 5/0069 |
| 9,231,425 | B2* | 1/2016 | Lee | B60L 58/18 |
| 9,242,561 | B2* | 1/2016 | Katayama | B60L 15/2036 |
| 9,731,779 | B2 | 8/2017 | Lamb | |
| 9,796,402 | B1* | 10/2017 | Suarez | B62B 5/0053 |
| 9,925,999 | B2 | 3/2018 | Young et al. | |
| 10,358,043 | B2* | 7/2019 | Dao | B60L 58/15 |
| 10,906,573 | B2* | 2/2021 | Chung | B62B 5/0073 |
| 11,535,290 | B2* | 12/2022 | Sa | B62B 3/001 |
| 11,584,417 | B2* | 2/2023 | Sa | G01L 5/22 |
| 11,691,658 | B2* | 7/2023 | Delgatty | B62B 5/0013 |
| | | | | 180/65.51 |
| 11,702,122 | B2* | 7/2023 | Raja | A61H 1/00 |
| | | | | 180/65.8 |
| 2005/0067207 | A1* | 3/2005 | Radtke | B60L 15/2063 |
| | | | | 180/223 |
| 2008/0041644 | A1 | 2/2008 | Tudek et al. | |

| | | | | |
|---|---|---|---|---|
| 2008/0066979 | A1* | 3/2008 | Carter | B60L 58/15 |
| | | | | 180/65.51 |
| 2011/0056177 | A1* | 3/2011 | Goto | B60L 50/20 |
| | | | | 56/14.7 |
| 2011/0313604 | A1* | 12/2011 | Kume | B62B 5/0404 |
| | | | | 701/22 |
| 2012/0176082 | A1* | 7/2012 | Lee | H01M 10/4264 |
| | | | | 903/907 |
| 2015/0060175 | A1* | 3/2015 | Katayama | B60L 3/104 |
| | | | | 180/197 |
| 2015/0066275 | A1* | 3/2015 | Masaki | B62B 5/0073 |
| | | | | 180/19.1 |
| 2015/0066278 | A1* | 3/2015 | Katayama | B62B 5/0069 |
| | | | | 180/6.66 |
| 2016/0075177 | A1* | 3/2016 | Biderman | B60L 58/21 |
| | | | | 301/6.5 |
| 2018/0118245 | A1* | 5/2018 | Chung | B62B 5/0043 |
| 2018/0162433 | A1* | 6/2018 | Jones | B62B 5/0036 |
| 2018/0244294 | A1* | 8/2018 | Ochiai | B62B 5/004 |
| 2018/0354375 | A1* | 12/2018 | Dao | H01M 10/44 |
| 2019/0329809 | A1* | 10/2019 | Mackay | B60K 17/043 |
| 2021/0070339 | A1* | 3/2021 | Delgatty | B60N 3/104 |
| 2021/0155278 | A1* | 5/2021 | Raja | A61H 3/04 |
| 2021/0229724 | A1* | 7/2021 | Sa | B62B 3/001 |
| 2021/0229725 | A1* | 7/2021 | Sa | B62B 5/0073 |
| 2021/0229729 | A1* | 7/2021 | Lee | B62B 3/001 |

* cited by examiner

600

605

617

623

621

613

601

611

603

661

648

641

647

631

667

646

645

665

1000

1000

MOTORIZED WAGON AND OPERATION METHOD THEREOF

CROSS-REFERENCE TO RELATED APPLICATIONS

This application incorporates by reference and claims the benefit of priority to U.S. Provisional Application 63/389, 565 filed on Jul. 15, 2022.

BACKGROUND OF THE DISCLOSURE

Field of the Disclosure

This disclosure relates to an all-terrain motorized wagon. More particularly, the disclosure relates to a motorized wagon with motorized hub wheels to enable enhanced wheel controls on a wagon.

Description of the Related Art

In markets today, there are very limited products offered for controlled motorized wagons. Wagons, including folding wagons, are well known in the art. Powered drive mechanisms for vehicles and wagons are also known in the art. While such wagons and drive mechanisms according to the prior art provide a number of advantages, they have certain limitations. The disclosed embodiments seek to overcome certain of these limitations and other drawbacks of the prior art, and to provide new features not heretofore available. A full discussion of the features and advantages of the various embodiments is deferred to the following detailed description, which proceeds with reference to the accompanying drawings.

Currently, there are no useful alternatives that effectively assist a user in carrying a heavy load over all types of terrain while having control over the wagon. Existing wagons that utilize a motor lack control and adaptability on all types of terrains. In addition, wagons that a motorized drive train with axis restrict the train and maneuverability of the wagon. And while some motorized hub-wheel technology is currently used in in electric bikes, motor scooters, motorized wheelchairs, and cars; these applications require a different types of motors and wheel designs to support user application. The current disclosure introduces a motorized hub wheel design used in conjunction with an electric wagon, including at least two motors, a lower wattage motor, and specific tire dimensions to support load and all-terrain usage, as well as shock absorbers to absorb weight.

In fact, no current solutions in the market offer control over speed and direction of the wagon on all terrain all while affording safety to the user. As will be disclosed below, the present disclosure addresses these needs and covers a device and method to use a motorized wagon with motorized hub wheels to prevent these inconveniences and solve these issues. The current disclosure utilized a motorized wagon with motorized hub wheels to simplify the drive train, increase control and adaptability on all types of terrain and assist in turning.

SUMMARY OF THE DISCLOSURE

In one aspect, the present disclosure is embodied as an all-terrain motorized wagon including a collapsible frame, motorized hub wheels technology, and a brushless motor allowing two or more independent systems to run through one control unit. Here, various speeds and torque can be controlled by a user through a control unit, allowing more movability and maneuverability across various types of terrain.

In one embodiment, the collapsible frame may include a left front arm and a left rear arm pivotably connected with the left front arm at a left axis point, a right front arm and a right rear arm pivotably connected with the right front arm at a right axis point, and a handle having a control unit. In another embodiment, the attachments are only on one side rather than to allow for more than a push type motion of the motorized wagon. The motorized wagon can also include a storage compartment, a base, and at least one or more motorized wheels. Here, at least two of the wheels are independently motorized wheels, wherein a motor sits within a wheel hub of each of the at least two independently motorized wheel. The motorized wagon system also includes a braking mechanism.

In one embodiment, the present disclosure is embodied as an all-terrain motorized and collapsible wagon where the handle can be a telescoping handle, a folding handle, a removable handle, and/or a non-folding handle. In one example, the collapsible motorized wagon also includes a control with a throttle, a joystick, indicating lights or other types of operation indicator such as an indicator of operation speed, operational status, a screen and/or a remote.

While in some embodiments, the wagon includes one or more motorized wheels, in other embodiments, all four wheels can be motorized and in yet another embodiment, at least one wheel is motorized. The wagon may include replaceable tires for various types of terrain and can be suitable for all types of terrain, whereas in some examples, specific wheels are adapted to specific types of terrain.

In embodiments where the wagon is collapsible, the collapsible frame collapses downward towards the base. The base can also include a battery. In one example, the storage compartment is a rigid, resilient or flexible material, including a polyurethane laminate, a canvas, a vinyl, a nylon, and/or any combination thereof. In another embodiment, the storage compartment is made of rigid or resilient and can be made using an injection type molding. In other embodiments, the collapsible frame includes an upper frame that is expandable lengthwise, along a width axis and or along both a width and length axis.

The wagon of the present disclosure can also include a braking mechanism where the braking system is an electronic braking system, a purely manual braking system, and/or an electromechanical braking system. Here, the disclosure can utilize a drum brake system which can either be purely mechanical or electromechanical.

A safety manual braking mechanism can be used to override the electronic braking system. The braking mechanism may also include one or more multiple sensors.

In one embodiment, one or more sensors are part of the motorized wagon. The system can include a speed sensor, a terrain sensor, and/or a weight sensor.

The wagon of the present disclosure further includes a control system disposed on the handle. The control system includes a first sensor, a second sensor, and a controller configured to receive measurements from the sensors. The first sensor is configured to measure a first force applied on a first portion of the handle and generate a first measurement. The second sensor is configured to measure a second force applied on a second portion of the handle and generate a second measurement. The controller controls the motor of the first wheel set based on the first measurement and controls the motor of the second wheel set based on the second measurement Before explaining the various embodiments of the disclosure in detail, it is to be understood that the disclosure is not limited in its application to the details of construction and to the arrangements of the components set forth in the following description or illustrated in the drawings. Rather, the disclosure is capable of other embodiments and of being practiced and carried out in various ways. Also, it is to be understood that the terminology employed herein is for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

For a better understanding of the disclosure, its operating advantages and the specific objects attained by its uses, reference should be made to the accompanying drawings and descriptive matter in which there are illustrated preferred embodiments of the disclosure.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

It should be noted that the drawing figures may be in simplified form and might not be to precise scale.

DETAILED DESCRIPTION OF THE DISCLOSURE

The embodiment and various embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1:
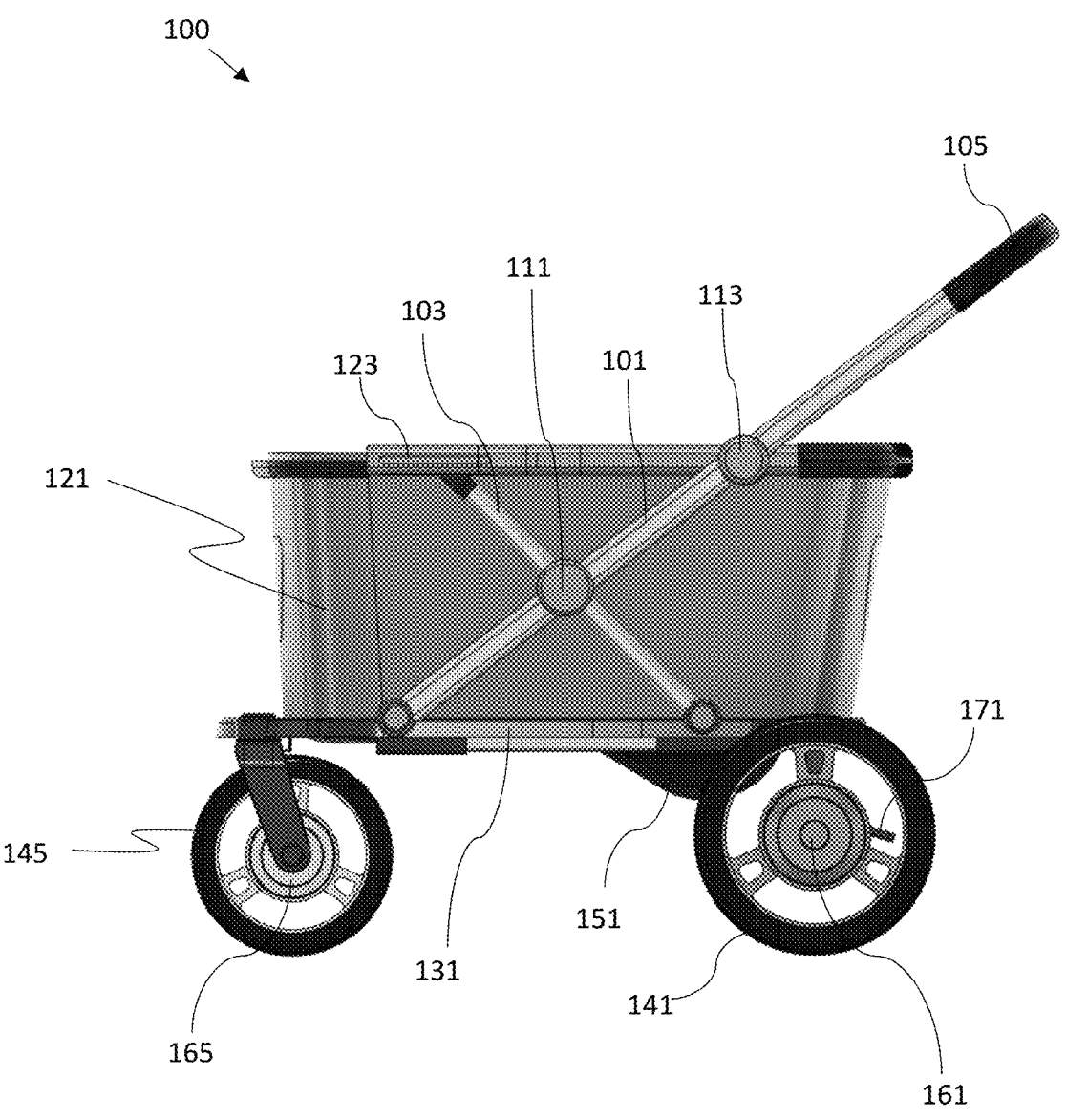
FIG. 1 is a side view of one embodiment of the present disclosure.

Referring now to the drawings and the characters of reference marked thereon, FIG. 1 shows a side view of one embodiment of the present disclosure. In the depicted side view, motorized wagon 100 includes a collapsible frame, storage compartment 121, base 131, motorized hub wheels 141, 145, and braking system 171. The depicted embodiment is a left side view, and a right side view is an identical mirror image. As depicted, the collapsible frame includes left front arm 101 and left rear arm 103 pivotably connected at left axis point 111. In the depicted embodiment, handle 105 is coupled to left front arm 101 at left joint 113. In some embodiments, handle 105 is a telescoping handle that telescopes in and out of left front arm 101. In some embodiments, handle 105 is a folding handle that folds at left joint 113. In some embodiments, handle 105 is a removable handle that may be removably attached at left joint 113 by an attachment mechanism. In some embodiments, handle 105 is a non-folding handle.

As depicted, motorized wagon 100 is in an expanded configuration. In some embodiments, when motorized wagon is in a collapsed configuration, the collapsible frame collapses downwards such that upper frame 123 moves downwards towards base 131. In some embodiments, upper frame 123 that is expandable lengthwise. In some embodiments base is 131 expandable lengthwise.

In some embodiments, storage compartment 121 is made of a flexible material that can fold accordingly once collapsible frame is in a collapsed configuration. In some embodiments, storage compartment 121 is made of a flexible material including a polyurethane laminate, a canvas, a vinyl, a nylon, and any combination thereof. In some embodiments, storage compartment 121 is made of a waterproof and durable material to withstand harsh conditions while providing sufficient protection for objects placed inside storage compartment 121. In some embodiments, storage compartment 121 is made of a stretchable material to accommodate adjustments in the length of upper frame 123 and base 131. In some embodiments, storage compartment 121 includes sufficient material to accommodate adjustments in the length of upper frame 123 and base 131.

As depicted, base 131 includes battery 151. In the depicted side view of motorized wagon 100, front motorized hub wheel 145 and rear motorized hub wheel 141 are attached base 131. In some embodiments, at least the front motorized hub wheel 145 and rear motorized hub wheel 141 are both independently motorized hub wheels. In the depicted embodiment, a motor sits within wheel hub 161, 165 of each independently motorized wheel 141, 145.

Figure 2:
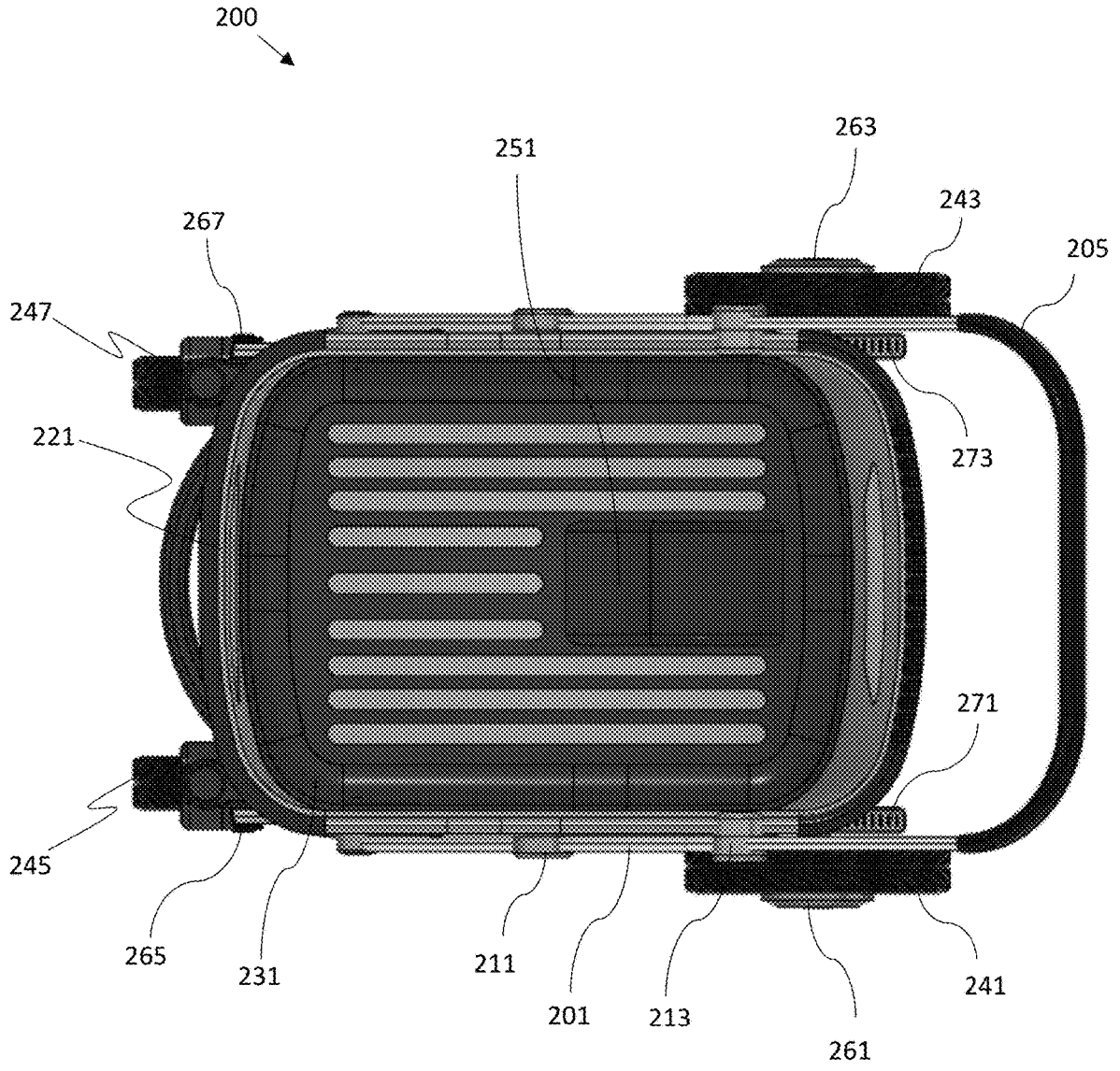
FIG. 2 is a top perspective view of one embodiment of the present disclosure.

FIG. 2 is a top perspective view of one embodiment of the present disclosure. As depicted, the inside of storage compartment 221 of motorized wagon 200 is visible. In some embodiments, the top surface of base 231 is visible in inside of storage compartment 221. As depicted, battery 251 is visible through inside of storage compartment. In some embodiments, battery 251 may be accessed by reaching through storage compartment 221 and opening the casing/housing that houses battery 251.

Storage compartment 221 of motorized wagon 200 is designed to hold objects, items, pets, and children in a safe manner. In some embodiments, storage compartment 221 may further comprise seat belts and other types restraining mechanisms to keep children, pets, and transported items safe in motorized wagon 200 in compliance with necessary safety requirements. In some embodiments, motorized wagon 200 may carry a load of up to 250 pounds. In some embodiments, motorized wagon may carry a load of up to 300 pounds.

In the depicted embodiment, motorized wagon 200 has two front wheels 245, 247 and two rear wheels 241, 243. In some embodiments, front wheels 245, 247 are each independently motorized such that motorized wagon 200 may be front wheel drive. In some embodiments, rear wheels 241, 243 are each independently motorized hub such that motorized wagon 200 may be rear wheel drive. In some embodiments front motorized hub wheels 245, 247 and rear motorized hub wheels 241, 243 are each independently motorized such that motorized wagon 200 may be all wheel drive. In the depicted embodiment the motor sits within wheel hub 261, 263, 265, 267 of wheels 241, 243, 245, 247. In all embodiments, the wheels are independently motorized via the use of hub wheel motors.

The depicted embodiment shows brakes 271, 273 coupled to rear wheels 241, 243. As depicted, brakes 271, 273 are pedals that may be pushed down to engage the braking system and flicked upwards to release the braking system. In some embodiments, braking system is at least one of an electronic braking system and manual braking system. In some embodiments, manual brake may include a sensor to activate brakes. In some embodiments, motorized wagon 200 has locking wheels in compliance with necessary safety requirements. In some embodiments, motorized wagon 200 has a braking system in which, when in neutral, pull the clutch disengaging the gear to move wagon 200 freely, and engaging brake engages gears through mechanical loss making it harder to push wagon 200. In one embodiment the break gear is controlled through the control unit. Different ratios are used for various top speeds. A planetary gear set may be used, or a 2 stage step down planetary gear can be utilizing including a clutch to select speed reduction or fuse to choose a power setting.

Figure 3:
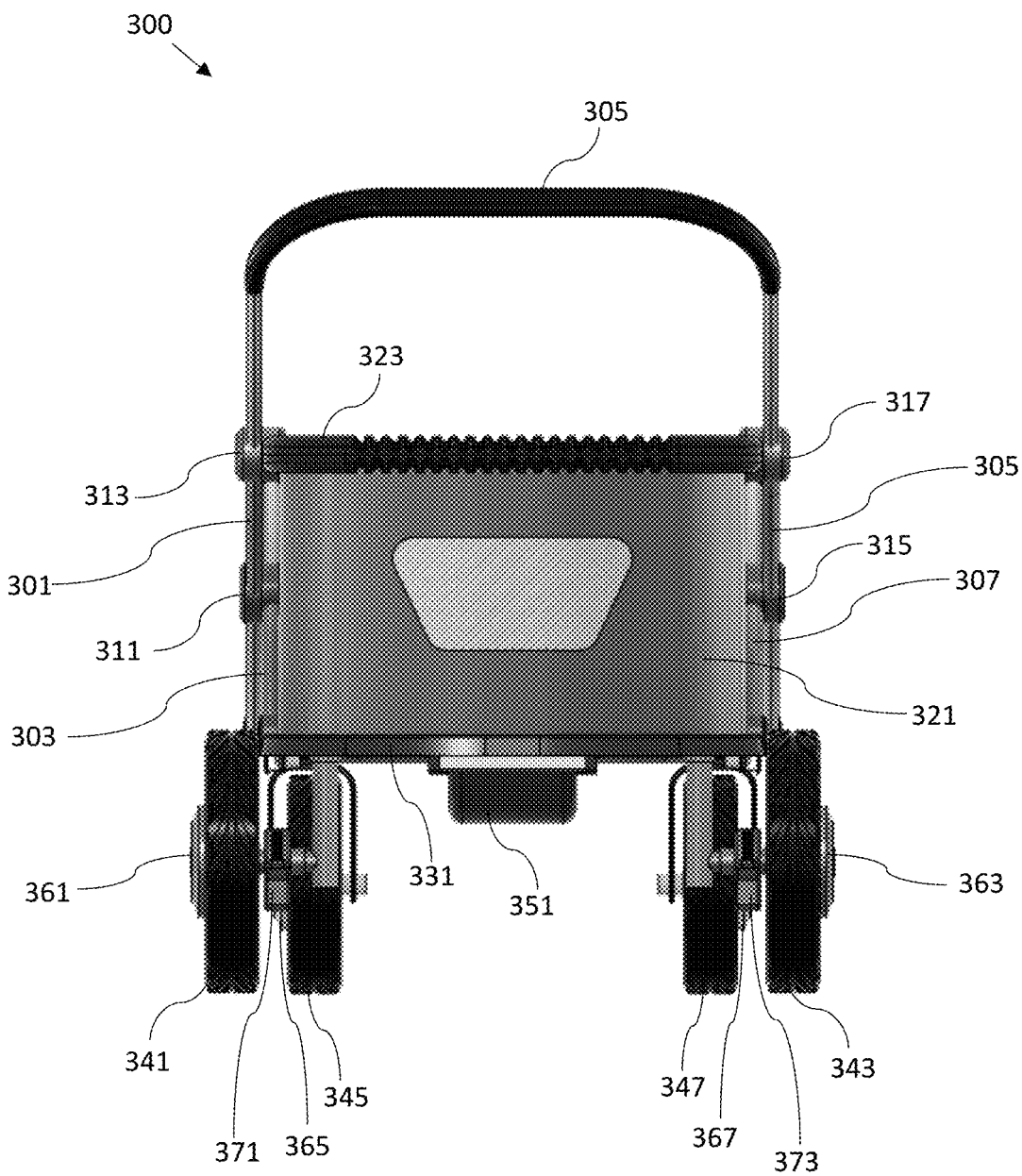
FIG. 3 is a rear view of one embodiment of the present disclosure.

FIG. 3 is a rear view of one embodiment of the present disclosure. In the depicted motorized wagon 300 includes a collapsible frame, storage compartment 321, base 331, rear wheels 341, 343, and front wheels 345, 347. As depicted, the collapsible frame includes left front arm 301 and left rear arm 303 pivotably connected at left axis point 311 and right front arm 305 and right rear arm 307 pivotably connected at right axis point 315. In the depicted embodiment, a left end of handle 305 is coupled to left front arm 301 at left joint 313, and a right end of handle 305 is coupled to right front arm 305 at right joint 317. In some embodiments, handle 305 is a telescoping handle that telescopes in and out of front arms 301, 305. In some embodiments, handle 305 is a folding handle that folds at joints 313, 317. In some embodiments, handle 305 is a removable handle that may be removably attached at joints 313, 317 by an attachment mechanism. In some embodiments, handle 305 is a non-folding handle.

In some embodiments, handle 305 has a control unit on or around the area where user grips the handle. In some embodiments, the control unit includes one or more of a throttle, a joystick, a screen, and a remote. In some embodiments, the control unit includes a pair of controls for respective left wheel, right wheel, and an option to control both. In some embodiments, the control unit includes controls for respective independently motorized left front wheel, right front wheel, left rear wheel, and right rear wheel. In some embodiments, control unit controls the direction of movement: forward, backward, left turn, and right turn. In some embodiments, the control unit may include a manual input feedback system, wherein the degree of pressure or squeezing applied by user thereby determines velocity. For example, the greater the pressure or squeezing applied results in greater velocity, and user applying less pressure or loosening grip may result in lower velocity. In some embodiments, manual input feedback includes twisting or rotating handle 305, such that rotating handle 305 in a forward direction away from the body drives motorized wagon 300 in a forward direction, and rotating handle 305 backwards towards the body drives the motorized wagon 300 in a backwards direction. In some embodiments, motorized wagon 300 may be electronically controlled for speed. In some embodiments, remote includes a control panel to control each independently motorized wheel.

In some embodiments, motorized wagon 300 is controlled by pushing the wagon, instead of pulling the wagon. In some embodiments, motorized wagon 300 includes a safety switch such that when switched on and/or activated, wagon may be pushed to move. In some embodiments, motorized wagon 300 includes a lockout switch if not actively switched on. In some embodiments, control unit includes a switch for changing between manual and electric modes.

Presently, some existing wagons have a single motor and at least one common axle connecting wheels. As depicted, unlike some existing wagons, motorized wagon 300 of the present disclosure has rear wheels 341, 343 and front wheels 345, 347 that are axle-less, providing for a unique wheel suspension system. The depicted axle-less embodiment allows for more storage room in storage compartment 321 of motorized wagon 300. Further each wheel 341, 343, 345, 347 is independently motorized. In some embodiments, each independent motor is a brushless DC electric motor (BLDC motor), located in within wheel hubs 361, 363, 365, 367 of wheels 341, 343, 345, 347, that is able to better control the speed of each wheel accurately. As depicted, front wheels 345, 347 are smaller in size than rear wheels 341, 343, and thus in some embodiments, the motors placed within wheel hubs 365, 367 of front wheels 345, 347 may be more compact in size than the motors placed within wheel hubs 361, 363 of rear wheels 341, 343. Here, a BLDC motor uses a linear potentiometer to control the motor speed. In some embodiments, gears in wheel may be a planetary gear set that may be manually, electronically, and/or automatically controlled.

Additionally, in some embodiments, the location of the motor in wheel hubs 361, 363, 365, 367 of wheels 341, 343, 345, 347 provide for better torque and the ability to stay at lower speeds for rough, high-friction terrain, such as sand, snow, dirt trails, wet conditions, and the like. In some embodiments, motorized wagon 300 is adapted for all terrains. In some embodiments, as each wheel's motor is controlled independently, motorized wagon 300 may have a turn assist system to navigate on rough terrain at lower speeds, thereby assisting user by controlling acceleration and braking, allowing user to focus on steering motorized wagon 300.

Figure 4:
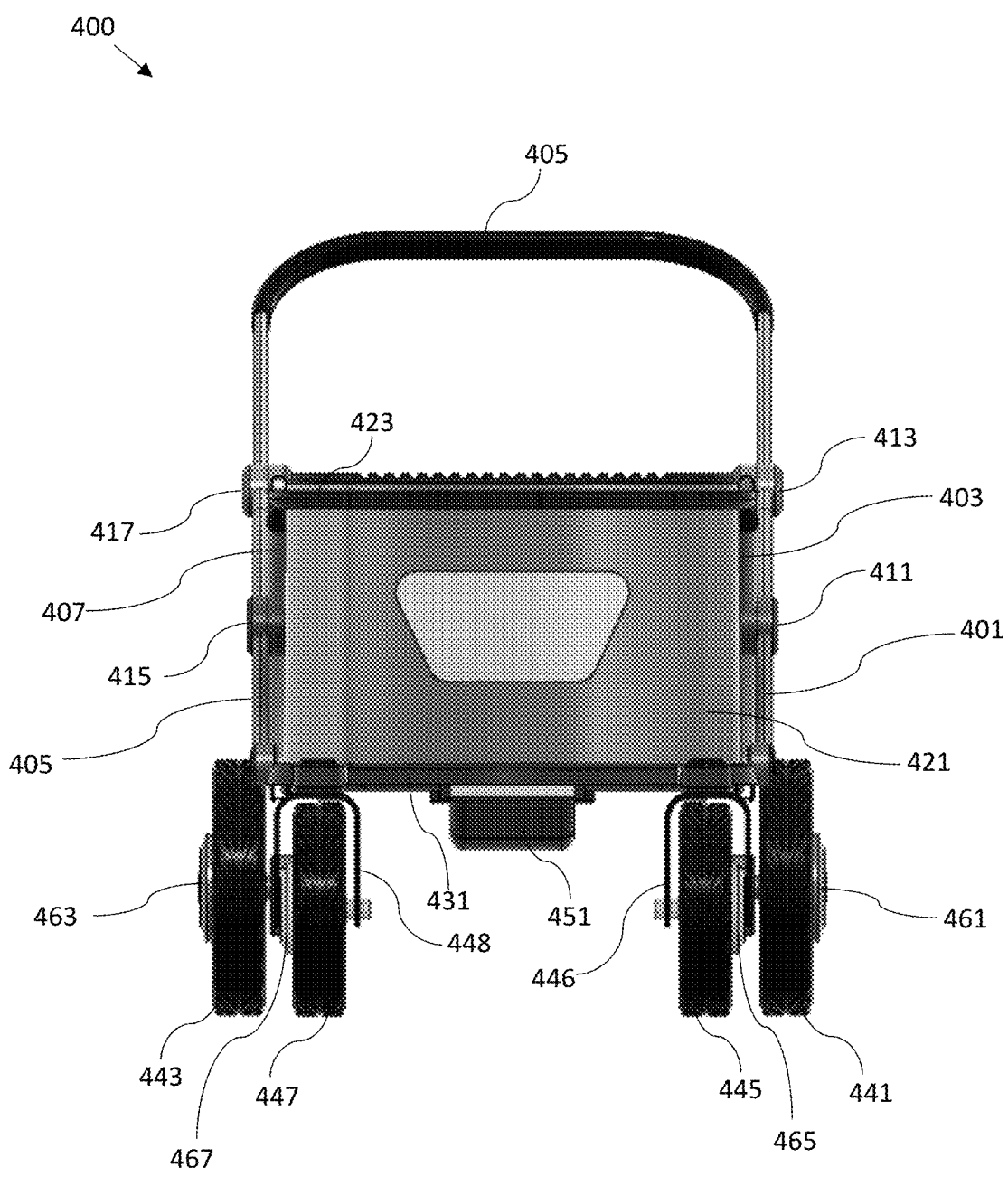
FIG. 4 is a front view of one embodiment of the present disclosure.

FIG. 4 is a front view of one embodiment of the present disclosure. In the depicted front view of motorized wagon 400, the distance between front wheels 445, 447 is less than the distance between rear wheels 441, 443. In the depicted embodiment, front wheels 445, 447 are located at a front of base 431 via casters 446, 448 having a yoke. In some embodiments, casters 446, 448 are attached to base 431. In some embodiments, casters 446, 448 are a part of base 431. In some embodiments, casters 446, 448 may swivel so that wheels can swivel. In some embodiments, casters 446, 448 are fixed. In some embodiments, casters may swivel to maximum angle of 180 degrees. In some embodiments, front wheels 445, 447 attached via casters that swivel may be optionally locked. Here, rear wheels 443, 445 and front wheels 445, 447 each have an independent motor, such that each wheel may have a manual input and for each wheel, controlling a variety of factors including direction, turn angles, speeds, and more.

Figure 5:
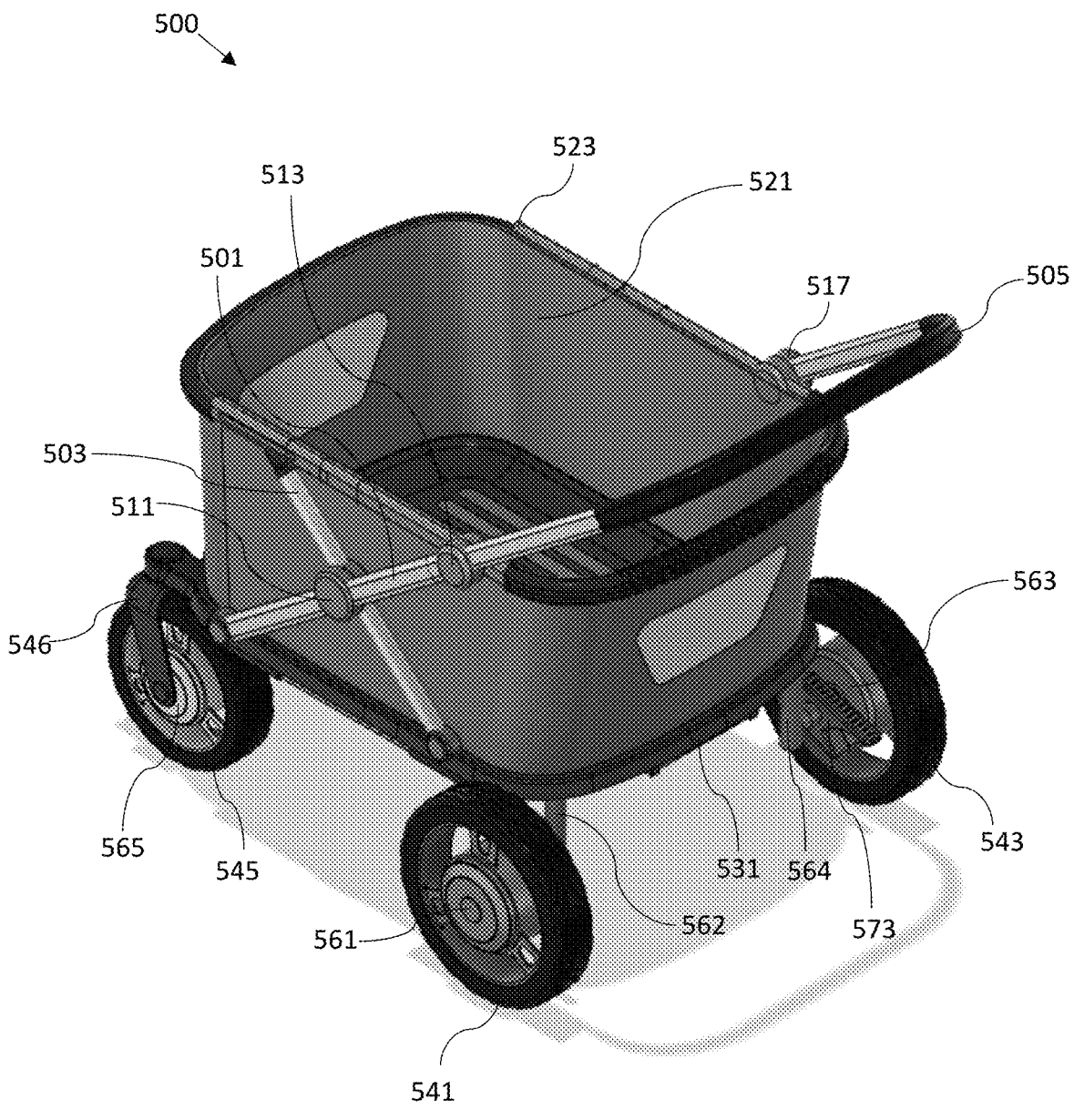
FIG. 5 is a rear, top, side perspective view of one embodiment of the present disclosure.

FIG. 5 is a rear, top, side perspective view of one embodiment of the present disclosure. From the depicted angle of motorized wagon 500, the rear wheels 541, 543 are fixed wheels situated at a width greater than or equal to the width of base 531. As depicted, vertical column 564 extends down from base 531 and connects to brake 573 and wheel hub 563 of rear wheel 543, in which an individual motor is located. Similarly, as depicted, vertical column 562 extends down from base 531 and connects to brake (not visible) and wheel hub 561 of rear wheel 541, in which an individual motor is located.

Figure 6:
FIG. 6 is a front, top, side perspective view of one embodiment of the present disclosure.

FIG. 6 is a front, top, side perspective view of one embodiment of the present disclosure. In the depicted embodiment, motorized wagon 600 has front wheels 645, 647 that swivel. In some embodiments, front wheels 645, 647 that swivel are attached to base 631 via casters 646, 648. In some embodiments, front wheels 645, 647 that swivel are directly or indirectly attached to base 631 via existing attachment mechanisms. In some embodiments, rear wheels 641, 643 are fixed, driving wheels having minimal or no swivel capability to maintain stability in movement of motorized wagon 600.

Generally, a steering linkage may exist for wheels connected by an axle. In some embodiments, when at least two wheels are independently motorized wheels, there is a steering linkage. Here, wheels connected with a common axle do not have a steering linkage. However, a wagon with a common axle and is pushed, can have a steering linkage and a differential gear set on the common axle.

FIG. 6 shows a steering system is in the front of motorized wagon 600. The motorized wagon 600 can have rear-wheel drive such that one rear wheel may move forward, while the other rear wheel can move backward, which may aid/assist in one or more of steering, turning capabilities, maneuverability, and changing direction of the movement of motorized wagon 600. Existing wagons having a back axle lack the capability for rear wheels to move independently.

The present disclosure shows a motorized wagon having independent motors allowing for each wheel to be capable of rotating at different speeds and in different directions. The motors may be geared or non-geared, as different motors provide for different control schemes.

Figure 7:
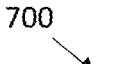
FIG. 7 is a bottom perspective view of one embodiment of the present disclosure.
Figure 7:
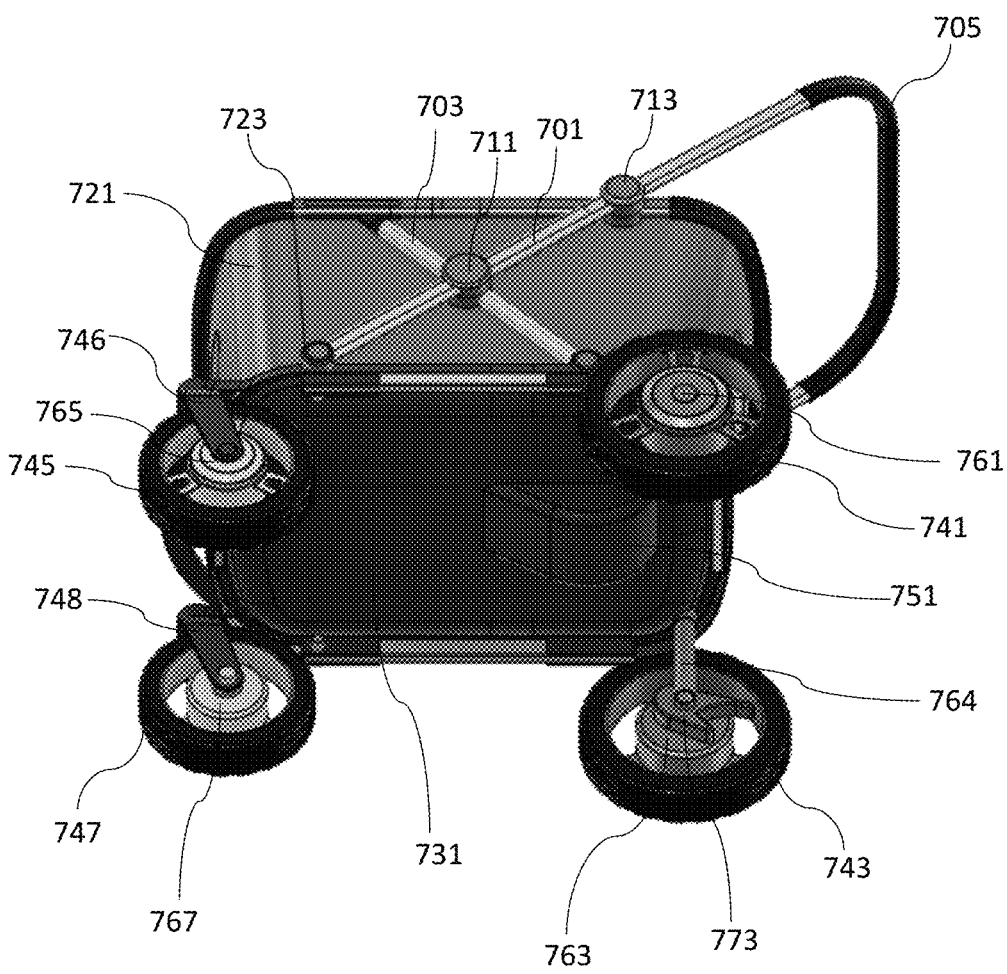

FIG. 7 is a bottom perspective view of one embodiment of the present disclosure. In the depicted embodiment, a bottom view of base 731 of motorized wagon 700 is shown. In the depicted embodiment, battery 751 protrudes from a bottom of base 731. Battery 751 provides power source for the independent motors located within wheel hubs 761, 763, 765, 767. As depicted, placement of battery 751 is towards of motorized wagon 700 between rear wheels 741, 743. The height that battery 751 protrudes from bottom of base is less than the length of a radius of rear wheels 741, 743 and a length of a radius of front wheels 745, 747, thereby minimizing abutting and/or crashing into objects on the terrain.

As depicted, battery 751 is housed within base 731. In some embodiments, base 731 is made of a glass-filled polypropylene material, that is durable, waterproof, and lightweight, thereby providing sufficient protection as a casing or housing for battery 751 housed within. In some embodiments, battery 751 is rechargeable. In some embodiments, battery 751 includes replacement of non-rechargeable batteries. In some embodiments, battery 751 may be accessed via the bottom of base. In some embodiments, battery 751 may be accessed through the top surface of base through storage compartment 721. In some embodiments, battery 751 and control unit are required to enable the control assist nature of motorized wagon 700.

Further depicted in FIG. 7 is one embodiment of collapsing mechanism of collapsible frame. As depicted, left rear arm 703 and left front arm 701 are pivotably connected at left axis point 711. In the depicted embodiment, upper frame 723 has one or more tracks located along a segment of upper frame. As the depicted motorized wagon 700 is collapsed downward, a top end of left rear arm 703 slides along the track of upper frame 723 towards the front of motorized wagon 700 while rotating at left axis point 711, thereby collapsing storage compartment 721 downwards. The same collapsing mechanism exists for the right side (not visible). In some embodiments, other types of collapsing mechanisms may be used.

In some embodiments, dimensions of motorized wagon 700 in an expanded configuration may have a length of about 37 inches, width of about 26 inches, and height of about 24 inches. In some embodiments, motorized wagon 700 alone weighs roughly 28 pounds. In some embodiments, the length of wagon may be greater than or less than 37 inches, the width may be greater than or less than 26 inches, and the height may be greater than or less than 24 inches.

Figure 8:
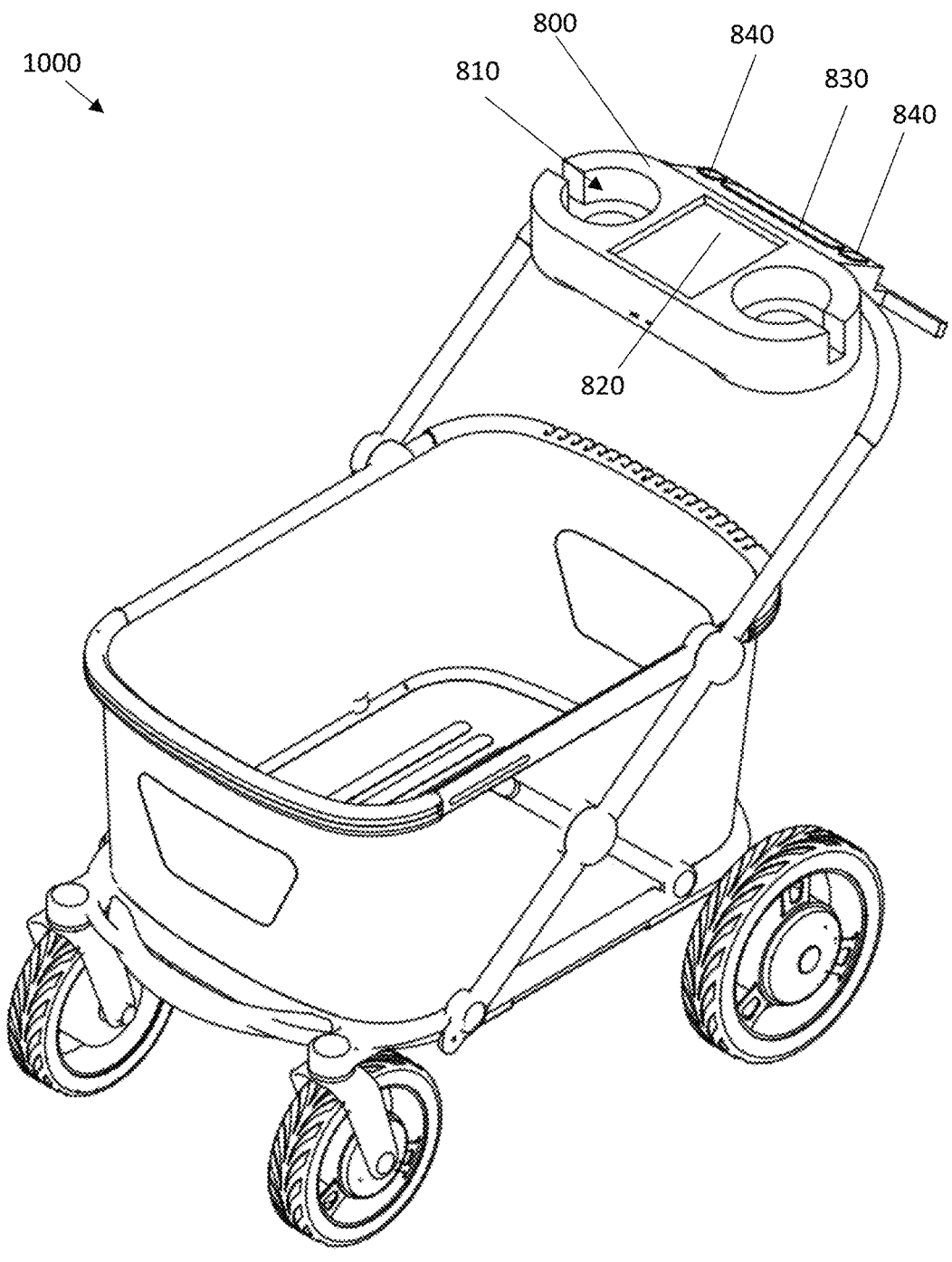
FIGS. 8 and 9 are respectively a perspective and a top view of another embodiment of the present disclosure.
Figure 9:
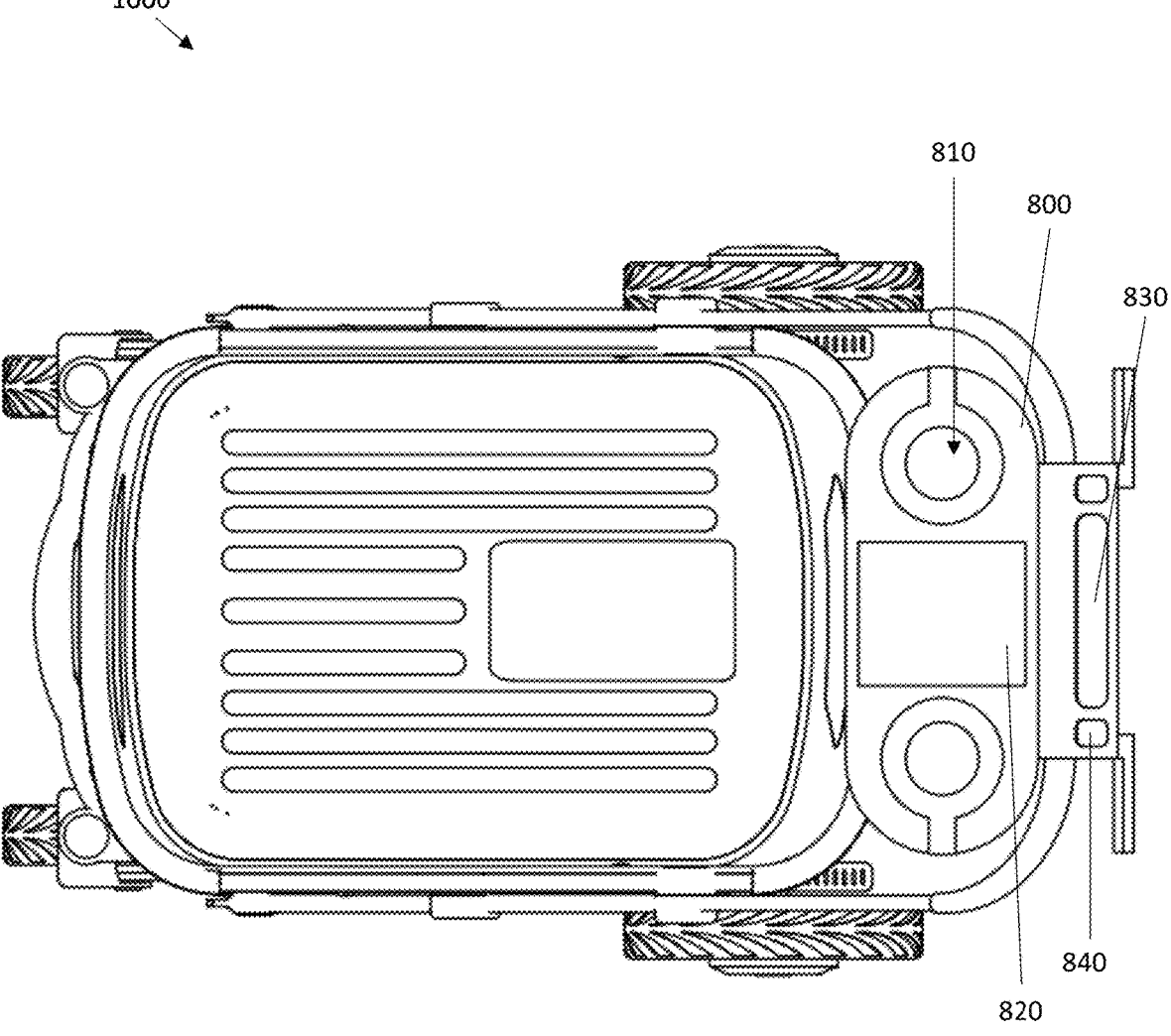

FIGS. 8 and 9 are respectively a perspective and a top view of one embodiment of the motorized wagon 1000 of the present disclosure. The motorized wagon 1000 further includes a user panel 800 configured to interact with the user and accept user input. The user panel 800 includes a pair of container holding portions 810 configured to hold containers such as portable drink container. The user panel 800 also includes a display 820 configured to show messages to the user, wherein the display 820 can also be a touch panel configured to accept user inputs. The user panel 800 further includes a status indicator 830 configured to show information associated with the motorized wagon 1000. For instance, the status indicator 830 can be connected to a power sensor (for measuring the power level of the battery) and configured to show different power levels with different lights or images. The user panel 800 further includes one or more user input device 840 configured to accept user input to adjust the functionalities of the motorized wagon 1000 based on the user input. For instance, the user input device

840 can be used to switch on the motorized wagon 1000, switch the motorized wagon 1000 between manual and electric mode, switch the showing of statuses of various parts of the motorized wagon 1000 on the status indicator 830, adjust the parameters of the display 820 and status indicator 830 such as brightness. The user input device 840 can also be configured to accept biometric information such as a person's fingerprint or iris (as a camera), and use the information as security clearance to operate the motorized wagon 1000. In different embodiments, the user input device 840 can be replaced with alternatives such as knobs, switches, keys, sliding mechanism, touch panel, and other conventional user input devices.

Figure 10:
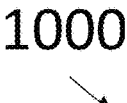
FIG. 10 is a block diagram of a motorized wagon according to one embodiment of the present disclosure.
Figure 10:
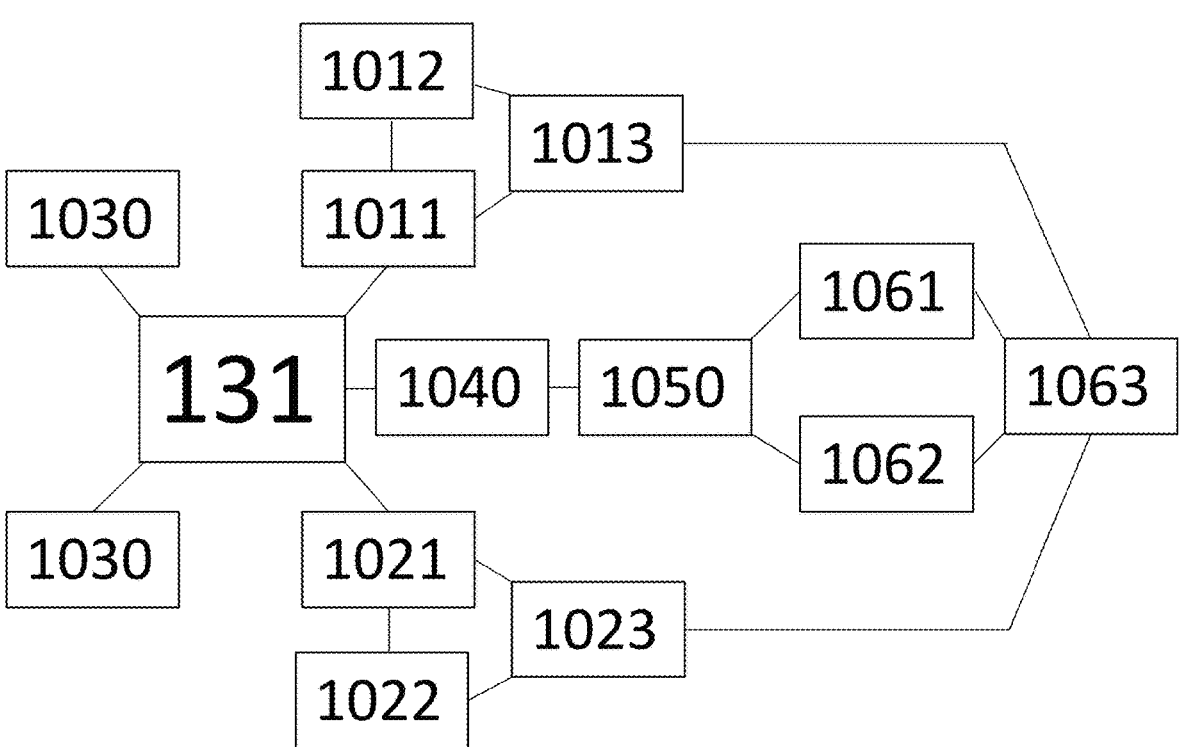

FIG. 10 is a block diagram of a motorized wagon 1000 according to one embodiment of the present disclosure. Please also refer to FIGS. 1-7 for references to the system's elements. The motorized wagon 1000 includes a plurality of wheel sets connected to the base 131. In the present embodiment, the system includes a first motorized wheel set, a second motorized wheel set, and two non-motorized wheels 1030 each connected to the base 131. In different embodiments, the system 1000 can includes two, three, or other numbers of motorized wheel sets depending on the desired load capacity, intended terrain for the motorized wagon 1000 to operate, maneuverability, controllability, etc. The first motorized wheel set includes a first wheel hub 1011 connected to the base 131, a first wheel 1012 connected to the wheel hub 1011, and a first motor 1013 coupled with the first wheel hub 1011 and the first wheel 1012, wherein the first motor 1013 is configured to drive and rotate the first wheel 1012. Similarly, the second motorized wheel set includes a second wheel hub 1021 connected to the base 131, a second wheel 1022 connected to the second wheel hub 1021, and a second motor 1023 coupled with the second wheel hub 1021 and the second wheel 1022, wherein the second motor 1023 is configured to drive and rotate the second wheel 1022.

Each of the above-mentioned motorized wheel sets further includes a transmission unit coupled to the wheel and the motor, wherein the transmission unit is configured to transfer power from the motor to the wheel for rotation. Different embodiments of the transmission unit will be discussed below.

The motorized wagon 1000 further includes a control system configured to accept user inputs and separately control the wheel sets based on said user inputs. Firstly, a frame 1040 is coupled with the base 131 and a handle 1050 is coupled with the frame 1040, wherein the frame 1040 and handle 1050 are substantially identical to the ones discussed in the previous paragraphs. The control system includes at least a first sensor 1061 and a second sensor 1062 disposed on the handle 1050. The first and second sensors 1061, 1062 are disposed on different portions of the handle 1050 and each is configured to measure the forces applied on the corresponding portion of the handle 1050. More specifically, in the present embodiment, each sensor 1061, 1062 is configured to measure forces applied by one hand on one portion of the handle 1050. The control system further includes a controller 1063 connected to the first sensor 1061 and the second sensor 1062, wherein the controller 1063 controls the first motorized wheel set based on the measurement by the first sensor 1061. Similarly, the controller 1063 controls the second motorized wheel set based on the measurement by the second sensor 1062. The above-mentioned control scheme allows the control system to aid the user in moving the motorized wagon 1000 based on how a user would normally operate a wagon.

Figure 11:
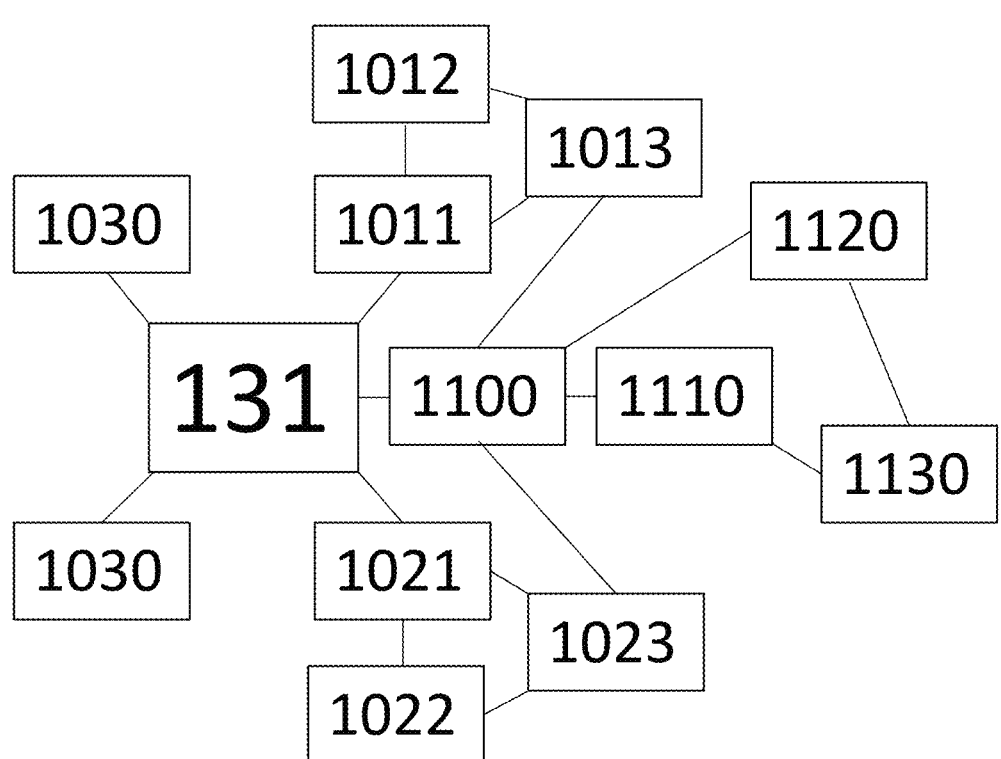
FIG. 11 is another block diagram of a motorized wagon system according to the embodiment illustrated in FIG. 10.

FIG. 11 is another block diagram of a motorized wagon 1000 according to the embodiment illustrated in FIG. 10. The control system further includes a power sensor 1110 connected to a power source 1100 (such as battery or generator) and configured to measure the power level of the power source 1100. The control system can also include a temperature sensor 1120 configured to measure the temperature of the power source 1100. The control system also includes a display 1130 configured to show various information associated with the motorized wagon 1000. The display 1130 is connected to various sensors of the system and is configured to show information such as power level and temperature of the battery, etc. Further, the display 1130 of the present embodiment is a touch display panel connected to the controller 1063 (illustrated in FIG. 10) and configured to accept user inputs. The display 1130 then relay the user input to the controller 1063 in order for the user to control the motorized wagon 1000 through the controller 1063. In one embodiment, the user can use the display 1130 as an activation device to turn the motorized wagon 1000 on. The user can use the display 1130 to adjust the levels of assistance the controller can provide to the user in terms of how much power should be provided to the wheels. For instance, the first level provides 0 assist, the second level provides a light assist, and the maximum level provides full assistance to the rated capability of the equipment.

As mentioned above, the controller 1063 determines how much force should be transferred to each wheel and in what direction the wheel should be rotated, based on the signals from the corresponding sensor representing the forces applied on the handle 1050.

In another embodiment of the present disclosure, the control system can adjust the rotation speed and rotation direction of the wheel 1012, 1022 based on the combination of sensor measurements. When the controller 1063 receives force measurements from the first and second sensors 1061, 1062, the controller 1063 then determines the actual forces applied on the sensors 1061, 1062. The controller 1063 can subtract the two forces from each other to arrive at a net force vector. The controller 1063 can deduce that the user probably intends to make a turn based on the net force vector. The controller 1063 can then adjust each wheel's rotation direction and speed based on the direction and magnitude of the net force vector. For instance, if the net force vector indicates that the user push the left side of the wagon harder than pulling the right side of the wagon, the controller 1063 can deduce that the user intends to make a right turn and adjust the wheels' speed and direction to turning right a bit easier. In this way, the controller 1063 can help the user make a smoother turn, if required. Similarly, if the net force vector indicates that the user pull the left side of the wagon than pulling the right side of the wagon, the controller 1063 can deduce that the user intends to back up and make a left turn and adjust the wheels' speed and direction to make turning left a bit easier for the user.

Figure 12:
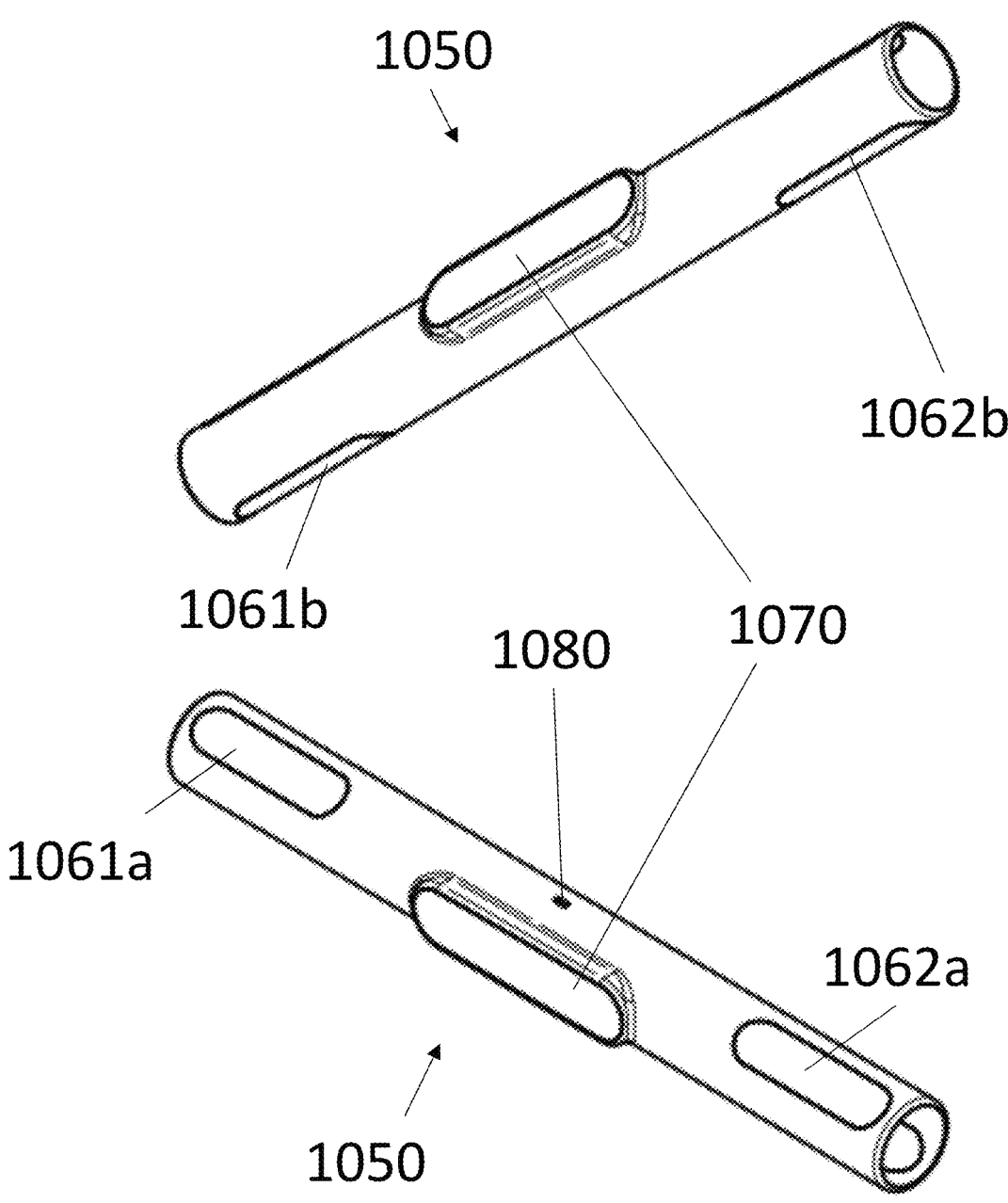
FIG. 12 includes perspective views of a handle according to one embodiment of the present disclosure.

FIG. 12 illustrates perspective views of the handle 1050 according to one embodiment of the present disclosure. As illustrated, first and second sensors are respectively disposed on the left and right portions of the handle 1050, wherein left and right portions of the handle each corresponds to one hand of the user. The first sensor includes a first push sensor 1061*a* and a first pull sensor 1061*b* both of which are disposed on the left portion of the handle 1050. The first push sensor 1061*a* corresponds to the palm of the user's left hand and is configured to measure the push force by the left hand. The first pull sensor 1061*b* corresponds to the fingers of the user's left hand and is configured to measure the pull force by the left hand. Similarly, the second sensor includes a second push sensor 1062*a* and a second pull sensor 1062*b* both of which are disposed on the right portion of the handle 1050. The second push sensor 1062*a* corresponds to the palm of the user's right hand and is configured to measure the push force by the right hand. The second pull sensor 1062*b* corresponds to the fingers of the user's right hand and is configured to measure the pull force by the right hand. In the embodiment, the above-mentioned sub-sensors 1061*a-b*, 1062*a-b* include load cells such as pneumatic load cells, hydraulic load cells, piezoelectric crystal load cells, inductive load cells, capacitive load cells, magnetostrictive load cells, strain gage load cells, etc. The sub-sensors 1061*a-b*, 1062*a-b* also include other types of force sensors such as strain gages, force sensing resistors, optical force sensors, and ultrasonic force sensors.

In the embodiment illustrated in FIG. 12, the first sensor and the second sensor each includes a push sensor 1061*a*, 1062*a* configured to measure push forces by the user's left/right hand and a pull sensor 1061*b*, 1062*b* configured to measure pull forces by the user's left/right hand. However, in different embodiments, the first sensor can include one sensor disposed on and expanding over the left portion of the handle to measure both the push and pull forces by the user's left hand. Similarly, the second sensor can include one sensor disposed on and expanding over the right portion of the handle to measure both the push and pull forces by the user's right hand. In addition, the first and second sensors are configured to measure the magnitude of the forces and the magnitude measurements are used to determine the motor load and how fast the corresponding wheels should be rotated. Generally, the force measured by a sensor and the motor load are directly proportional.

Further, in the previous embodiments, the user interact with the motorized wagon through the touch display 1070 on the handle 1050. The handle 1050 also includes a port 1080, such as a USB-C port, configured to allow the user to charge the electronic devices on the handle 1050. The user can also interact with the electronic devices on the handle 1050 in a wired manner through the port 1080. Further, the electronic devices on the handle 1050 can be configured to wirelessly (such as Bluetooth or other wireless communication standards) connect with smart devices to accept user input. For instance, the user can wirelessly turn the motorized wagon on and off using an application installed on a smart device.

Figure 13:
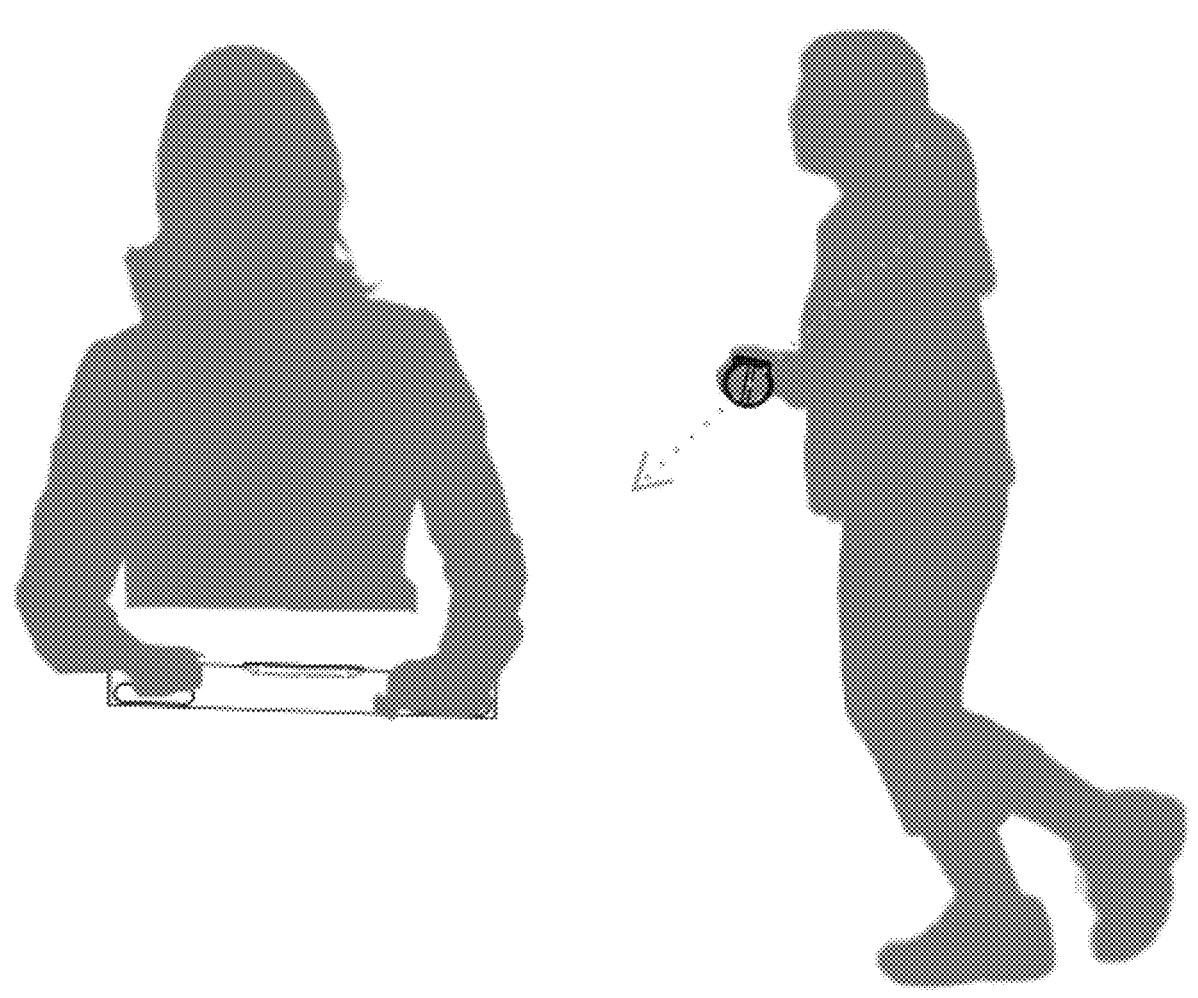
FIG. 13 are illustrations of how a user would interact with the handle and the sensors thereon according to one embodiment of the present disclosure.

FIG. 13 includes illustrations of how a user would interact with the handle and the sensors thereon according to one embodiment of the present disclosure. As a user is normally pushing the motorized wagon system their hands will naturally go to two different locations on the wagon handlebar. At these locations there will also be placed force sensors such as pressure pads that control the forward direction for assist. When the user is pushing with very light or no force in the handle the assist will be very minimal to none. There is a minimum threshold of force required to engage the motors in forward motion. If pushed evenly the wagon will move perfectly straight forward, however, if there is a very gradual turn such as on a long curved path, it naturally favors pushing greater with the hand that is on the outside of the turn. This increased force also increases the assistance associated with that particular motor which assists in a slight turn. If the user is making a typical turn such as found on sidewalks or at the intersection of trails, the user wouldn't typically press forward with the hand on the inside of the turn. Instead, the user would either squeeze or pull back slightly with the hand on the inside of the turn and simultaneously pushing with the hand on the outside of the turn.

In this case the wheel on the inside of the turn may slightly move forward while the wheel on the outside of the turn will move a much greater distance to complete that turn naturally.

On an extremely tight turn, the user may squeeze both handles or alternatively pull with the hand on the inside of the turn and push with the hand on the outside of the turn which would actually drive the wheel on the inside of the turn in the reverse direction and cause the wagon to take a very sharp turn or allowed to change directions and even swivel in place. Reversing the wagon works similarly. The sensors that are facing away from the user if pulled will assist the wagon in reversing, decelerating, or moving upward in descending hills. The degree of force also changes the degree that each wheel is supported.

If the user is turning left, the user will typically pull back on the left side of the handle grip and push on the right side of the handle grip. The two forces cause the first pull sensor and the second push sensor to generate signals which in turn cause the corresponding motors to be driven differently. The motor on the left side is to be driven in reverse while the motor on the right side is to be driven forward according to the degree of pressure exerted. If the user want to reverse the wagon, he/she can pull back on the handles with both hands. The two forces cause the first pull sensor and the second pull sensor to generate signals which in turn cause the corresponding motors to be driven to move the corresponding wheel in a similar manner. If the user want to hold position, he/she can simply stop engaging or apply almost no force on the handle.

Figure 14:
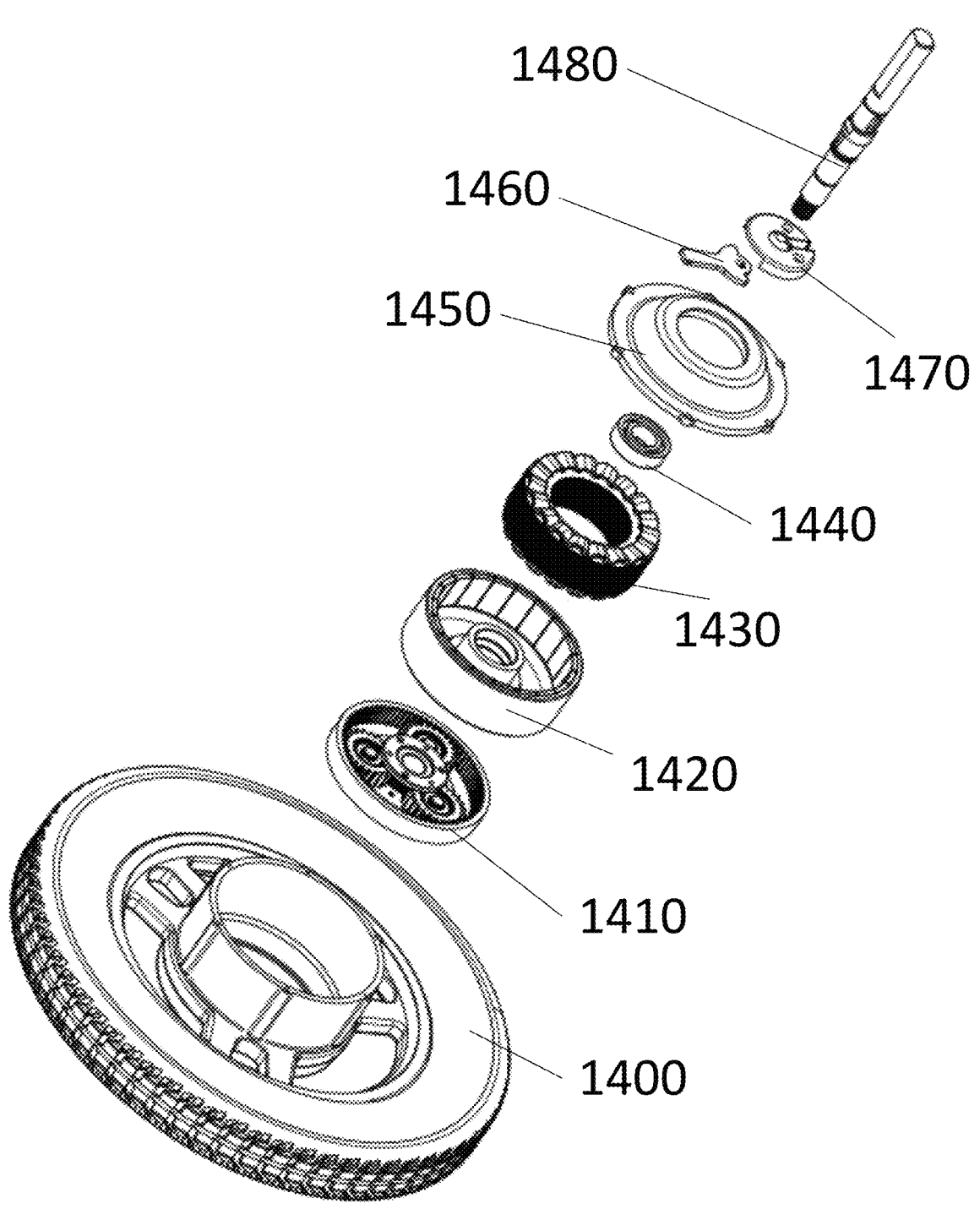
FIG. 14 shows an exploded view of a wheel set according to one embodiment of the present disclosure.

FIG. 14 shows an exploded view of a wheel set according to one embodiment of the present disclosure. The wheel set includes a wheel 1400, a planetary gear box 1410, a stator 1420, a rotor 1430, a bearing 1440, a cap 1450, a brake element 1460, a brake wedge 1470, and a shaft 1480, wherein the stator 1420, rotor 1430, bearing 1440, and cap 1450 form a motor. Also, the motor in the present embodiment is a brushless DC motor. The rotor 1430 is normally located on the inside of the stator 1420 and contains coil windings that are powered by the DC current. On the other hand, the stator 1420 contains either permanent magnets or electromagnetic windings. When the motor is powered by DC current from the battery or other power source, a magnetic field is created within the stator 1420, attracting and repelling the magnets on the rotor 1430. This causes the rotor 1430 to start rotating. To keep the rotor 1430 rotating, the motor has a commutator (not illustrated). When the rotor 1430 aligns with the magnetic field, it would stop spinning, but in this case the commutator would reverse the current through the stator 1420 and this way reverse the magnetic field. This way the rotor 1430 can keep spinning. The motor of the present embodiment can include a brushed DC motor, a separately excited DC motor, a permanent magnet DC motor, a self-excited DC motor, brushless DC motor, and a servo DC motor. The motor can also include AC motor such as synchronous motor, induction motor (single phase and three-phase induction motors).

Figure 15:
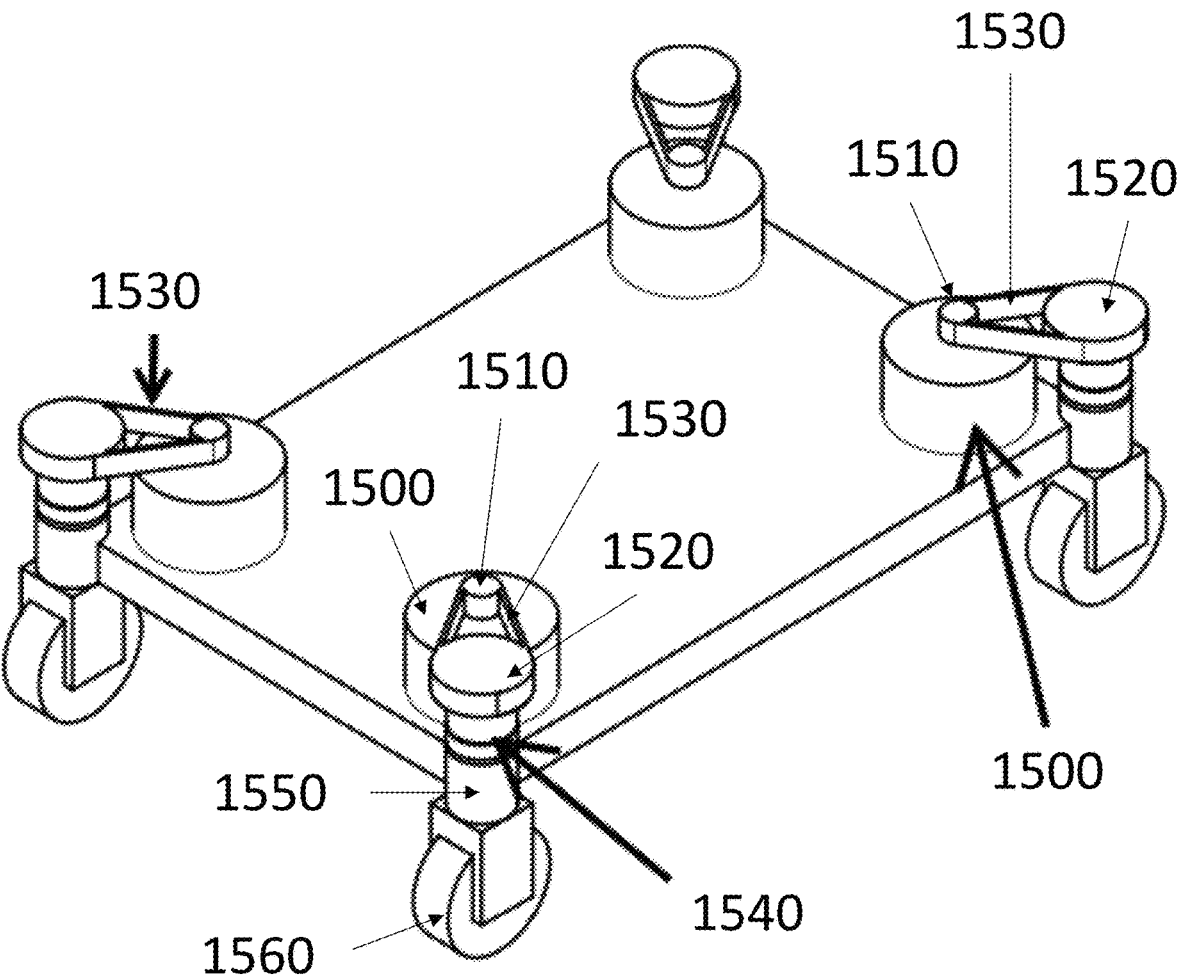
FIG. 15 is a perspective view of the wheel sets in another embodiment of the present disclosure.

FIG. 15 is a perspective view of the wheel sets in another embodiment of the present disclosure. In the present embodiment, each of the wheel set includes a motor 1500, an input shaft 1510 coupled with the motor 1500, an output shaft 1520, a belt 1530 coupled with both the input and output shafts 1510, 1520, a clutch 1540 coupled with the output shaft 1520, a transmission unit 1550 coupled with the clutch 1540, and a wheel 1560 coupled with the transmission unit 1550.

In the present embodiment, when the first sensor detects that the user's left is pushing the handle it will send out signals to the controller. The controller then controls the motor to rotate (e.g., in a clockwise direction) and drive the corresponding wheel 1560 to move the wagon forward. When the motor is controlled by the controller to rotate in a clockwise direction, the input shaft 1510 then moves the belt 1530 which in turn rotate the output shaft 1520 also in a clockwise direction. The clutch 1540, currently engaging the transmission unit 1550, allows the transmission unit 1550 to rotate the corresponding wheel 1560 to move the wagon forward. Similarly, when the first sensor detects that the user's left is pulling the handle it will send out signals to the controller. The controller then drives the motor to in a counter-clockwise direction to rotate the wheel 1560 to move the wagon backward.

In the above-mentioned embodiments, the reduction from the motor to the wheel 1560 output is preferably 25 to 1, but can vary on the output of the selected electric motor. Further, the wheel set described above makes use of planetary gearbox and belt drive as transmission unit. However, in different embodiments, the transmission unit can also include parallel gearbox, strain wave (harmonic) drive, cycloidal drive or other suitable transmission to efficiently transfer power from the motor to the wheel.

Figure 16:
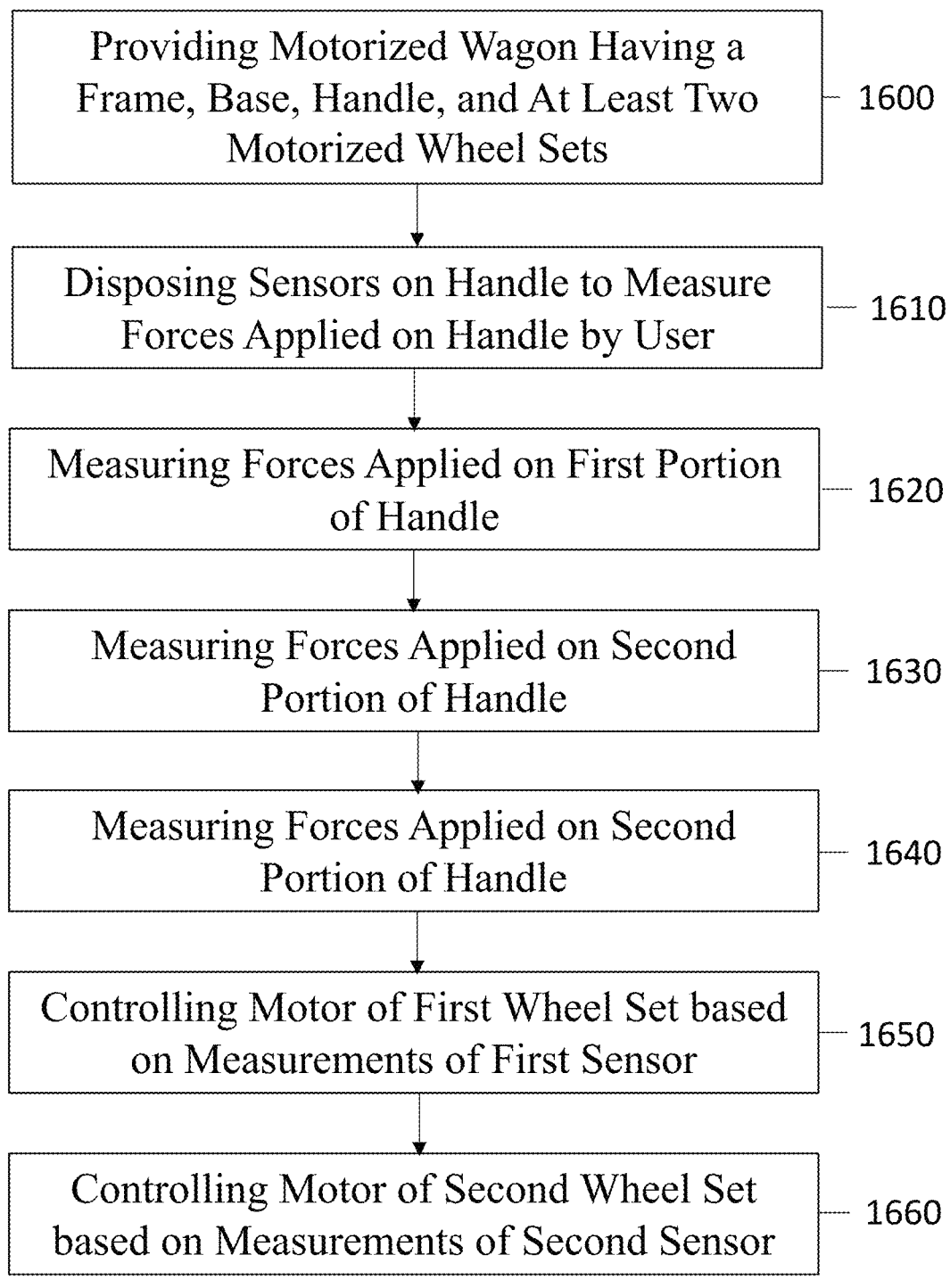
FIG. 16 is a flow chart of a method of operating a motorized wagon system according to one embodiment of the present disclosure.

FIG. 16 illustrates a flow chart of a method of operating a motorized wagon according to one embodiment of the present disclosure. The method includes step 1600 of providing a motorized wagon having a frame, a base, a handle, and at least two motorized wheel sets. The frame has a left arm and right arm. The base and handle are respectively connected to two end of the first arm and also two ends of the right arm. The first and second wheel sets are connected to the base. The motorized wagon is substantially similar to the one discussed above and thus will not be repeated here. The method further includes step 1610 of disposing sensors on the handle to measure forces applied on the handle by the user. The method then includes step 1620 of measuring forces applied on a first portion of the handle and step 1630 of measuring forces applied on a second portion of the handle. In the present embodiment, a sensor is disposed on the left portion of the handle and another sensor is disposed on the right portion of the handle, to measure forces applied on said left and right parts of the handle. However, in different embodiments, the sensors can be disposed on other part of the handle or other parts of wagon to measure forces, depending on the user's physically conditions such as height and disabilities.

In one embodiment, the first sensor and the second sensor each includes a push sensor configured to measure push forces by the user's hand and a pull sensor configured to measure pull forces by the same hand. However, in different embodiments, the first sensor can include one sensor disposed on and expanding over the left portion of the handle to measure both the push and pull forces by the user's left hand. Similarly, the second sensor can include one sensor disposed on and expanding over the right portion of the handle to measure both the push and pull forces by the user's right hand. Further, the first and second sensors are configured to measure the magnitude of the forces and the measurements are used to determine the motor load and how fast the corresponding wheels should be rotated. Generally, the force measured by a sensor and the motor load are directly proportional.

The method further includes step 1640 of controlling the motor of the first wheel set based on the measurement of the first sensor and step 1650 of controlling the motor of the second wheel set based on the measurements of the second sensor. The first and second wheels are controlled separately and based on measurements from different sensors. For instance, if the measurements from the left first sensor indicates that the user pushes the left portion of the handle, the controller then drives the motor of the left wheel set to rotate the wheel in a direction to move the wagon forward. Similarly, if the measurements from the right second sensor indicates that the user pulls the right portion of the handle, the controller then drives the motor of the right wheel set to rotate the wheel in a direction to move the wagon backward.

In another embodiment of the present disclosure, the method can adjust the rotation speed and rotation direction of the wheel based on the combination of sensor measurements. When the controller receives force measurements from the first and second sensors, the controller can determine a first force applied on the first sensor and a second force applied on the second sensor. The controller can then subtract the two forces from each other to arrive at a net force vector. The controller can deduce that the user probably intends to make a turn based on the net force vector. The controller can then adjust the wheel's rotation direction and speed based on the direction and magnitude of the net force vector. For instance, if the net force vector indicates that the user push the left side of the wagon harder than pulling the right side of the wagon, the controller can deduce that the user intends to make a right turn and adjust the wheels' speed and direction to turning right a bit easier. In this way, the controller can help the user make a sharper turn, if required. Similarly, if the net force vector indicates that the user pull the left side of the wagon than pulling the right side of the wagon, the controller can deduce that the user intends to back up and make a left turn and adjust the wheels' speed and direction to make turning left a bit easier for the user.

As mentioned above, other embodiments and configurations may be devised without departing from the spirit of the disclosure and the scope of the appended claims.

The invention claimed is:

1. A motorized wagon system, comprising:
a frame, including a left arm and a right arm;
a base connected to a first end of the left arm and a first end of the right arm;
a first motorized wheel set connected to a right portion of the base and a second motorized wheel set connected to a left portion of the base, wherein each of the first motorized wheel set and the second motorized wheel sets respectively includes:
a plurality of wheel hubs connected to the base;
a plurality of wheels, each of the plurality of wheels connected to each of the plurality of wheel hubs;
a brushless DC motor disposed within each of the plurality of wheel hubs and configured to drive and rotate each of the plurality of wheels; and
a linear potentiometer connected to the brushless DC motor to control a speed of the brushless DC motor;
a handle connected to a second end of the left arm and a second end of the right arm; and
a control system disposed on the handle and including:
a first sensor configured to measure a first force applied on a first portion of the handle and generate a first measurement;
a second sensor configured to measure a second force applied on a second portion of the handle and generate a second measurement; and
a controller connected to the first sensor and the second sensor, wherein the controller controls each brushless DC motor of the first motorized wheel set based on the first measurement, the control system controls each brushless DC motor of the second motorized wheel set based on the second measurement, such that the plurality of wheels of the first motorized wheel set and the plurality of wheels of the second wheel set rotate independently with respect to each other.

2. The motorized wagon system of claim 1, further comprising a power source disposed on the base and configured to provide power to the control system and the brushless DC motors, the base including a power source compartment for accommodating the power source.

3. The motorized wagon system of claim 2, further comprising:
   a third sensor configured to measure at least one of a temperature of the power source or a temperature of the power source compartment; and
   a temperature display connected to the third sensor and configured to display the temperature of the power source based on measurements by the third sensor.

4. The motorized wagon system of claim 2, further comprising:
   a fourth sensor configured to measure a power level of the power source; and
   a power level display connected to the fourth sensor and configured to display the power level based on measurements by the fourth sensor.

5. The motorized wagon system of claim 1, further comprising a safety switch configured to activate the brushless DC motors and the control system based on a user input by a user.

6. The motorized wagon system of claim 1, wherein
   if the first measurement indicates that the first force points to a first direction, the controller controls the brushless DC motor of the first wheel set to rotate the wheel of the first wheel set in a first rotation direction,
   if the first measurement indicates that the first force points to a second direction, the controller controls the brushless DC motor of the first wheel set to rotate the wheel of the first wheel set in a second rotation direction.

7. The motorized wagon system of claim 1, wherein the first measurement includes a first magnitude of the first force, the controller controls a rotation speed of the first wheel based on the first magnitude indicated by the first measurement.

8. The motorized wagon system of claim 7, wherein the first force is a grip force applied on the first portion of the handle, the second force is a grip force applied on the second portion of the handle.

9. The motorized wagon system of claim 1, wherein the controller generates a net force vector based on a combination of the first force and the second force, the controller is configured to adjust a rotation speed and a rotation direction of one of the wheels based on the net force vector.

10. The motorized wagon system of claim 1, further includes a fifth sensor configured to measure a temperature of a power source.

11. The motorized wagon system of claim 1, further comprising a brake system coupled with the wheels, wherein the brake system is selectively activated to inhibit motions of the wheels.

12. The motorized wagon system of claim 1, wherein the control system includes a mode switch connected to the brushless DC motors, the mode switch includes:

a manual mode where the brushless DC motors are disabled or prevented from driving the corresponding wheel; and
an electric mode where the brushless DC motors are activated or enabled to drive the corresponding wheel.

13. The motorized wagon system of claim 1, wherein the first motorized wheel set and the second motorized wheel set, each comprise:
   a planetary gear box disposed within the wheel to reduce speed of the wheels; and
   a stator disposed within the wheel and connected to the planetary gear box to generate a magnetic field and facilitate rotation of a rotor.

14. The motorized wagon system of claim 1, further comprising:
   a sixth sensor configured to measure a rotation speed and a rotation direction of the wheel of the first wheel set; and
   a seventh sensor configured to measure a rotation speed and a rotation direction of the wheel of the second wheel set.

15. A method of operating a motorized wagon system, comprising:
   providing a motorized wagon comprising:
   a frame, including a left arm and a right arm;
   a base connected to a first end of the left arm and a first end of the right arm;
   a first motorized wheel set connected to a right portion of the base and a second motorized wheel set connected to a left portion of the base, wherein each of the first motorized wheel set and second motorized wheel sets respectively includes:
      a plurality of wheel hubs connected to the base;
      a plurality of wheels, each of the plurality of wheels connected to each of the plurality of wheel hubs;
      a motor disposed within each of the plurality of wheel hubs and configured to drive and rotate each of the plurality of wheels; and
      a linear potentiometer connected to the brushless DC motor to control a speed of the brushless DC motor; and
   a handle connected to a second end of the left arm and a second end of the right arm;
   a battery disposed on at least a portion of the base and protrudes away from a bottom of the base, such that a height of the battery is less than a length of a radius of each wheel;
   measuring a first force applied on a first portion of the handle and generating a first measurement;
   measuring a second force applied on a second portion of the handle and generating a second measurement;
   controlling each motor of the first motorized wheel set based on the first measurement; and
   controlling each motor of the second motorized wheel set based on the second measurement, such that each wheel of the first motorized wheel set and the second motorized wheel set rotate independently with respect to each other, and each motor of the first motorized wheel set is more compact in size with respect to each motor of the second motorized wheel set.

16. The method of operating a motorized wagon system of claim 15, further comprising:
   if the first measurement indicates that the first force points to a first direction, controlling the motor of the first wheel set to rotate the wheel of the first wheel set in a first rotation direction; and if the first measurement indicates that the first force points to a second direction, controlling the motor of the first wheel set to rotate the wheel of the first wheel set in a second rotation direction.

17. The method of operating a motorized wagon system of claim 15, wherein the step of controlling the motor of the first wheel includes controlling a rotation speed of the first wheel based on a first magnitude of the first force indicated by the first measurement.

18. The method of operating a motorized wagon system of claim 15, further comprising:

generating a net force vector based on a combination of the first force and the second force; and adjusting a rotation speed and a rotation direction of one of the wheels based on the net force vector.

19. The method of operating a motorized wagon system of claim 15, further comprising switching the motors between:

a manual mode where the motors are disabled or prevented from driving the corresponding wheel; and an electric mode where the motors are activated or enabled to drive the corresponding wheel.

20. A motorized wagon system, comprising:

a frame, including a left arm and a right arm;

a base connected to a first end of the left arm and a first end of the right arm;

a first motorized wheel set connected to a right portion of the base and a second motorized wheel set connected to a left portion of the base, wherein the first motorized wheel set and the second motorized wheel sets respectively includes:

a plurality of wheel hubs connected to the base;

a plurality of wheels, each of the plurality of wheels connected to each of the plurality of wheel hubs;

a motor disposed within each of the plurality of wheel hubs and configured to drive and rotate each of the plurality of wheels; and a linear potentiometer connected to the brushless DC motor to control a speed of the brushless DC motor;

a third wheel set including:

a wheel hub connected to the base;

a swivel caster rotatably coupled with the wheel hub; and a wheel coupled with the swivel caster;

a handle connected to a second end of the left arm and a second end of the right arm;

a control system disposed on the handle and including:

a first sensor configured to measure a first force applied on a first portion of the handle and generate a first measurement;

a second sensor configured to measure a second force applied on a second portion of the handle and generate a second measurement;

a controller connected to the first sensor and the second sensor, wherein the controller proportionally controls the motor of the first motorized wheel set based on the first measurement, the control system proportionally controls the motor of the second motorized wheel set based on the second measurement, such that the plurality of wheels of the first motorized wheel set and the plurality of wheels of the second motorized wheel set rotate independently with respect to each other.

* * * * *